(12) United States Patent
Cakmak (10) Patent No.: US 11,239,682 B2
(45) Date of Patent: Feb. 1, 2022

(54) WIRELESS CHARGING PACK

(71) Applicant: Can Cakmak, Cambridge, MA (US)

(72) Inventor: Can Cakmak, Cambridge, MA (US)

( * ) Notice: Subject to any disclaimer, the term of this patent is extended or adjusted under 35 U.S.C. 154(b) by 0 days.

(21) Appl. No.: 16/597,238

(22) Filed: Oct. 9, 2019

(65) Prior Publication Data

US 2020/0112194 A1 Apr. 9, 2020

Related U.S. Application Data

(60) Provisional application No. 62/869,709, filed on Jul. 2, 2019, provisional application No. 62/743,128, filed on Oct. 9, 2018.

(51) Int. Cl.
*H02J 7/02* (2016.01)
*H02J 7/00* (2006.01)
*H04M 1/215* (2006.01)
*H02J 50/90* (2016.01)
*H02J 50/10* (2016.01)

(52) U.S. Cl.
CPC ............ *H02J 7/025* (2013.01); *H02J 7/0045* (2013.01); *H02J 7/027* (2013.01); *H02J 50/10* (2016.02); *H02J 50/90* (2016.02); *H04M 1/215* (2013.01)

(58) Field of Classification Search
CPC .. H02J 7/025; H02J 50/90; H02J 50/10; H02J 7/0045; H02J 7/027; H04M 1/215
See application file for complete search history.

(56) References Cited

U.S. PATENT DOCUMENTS

| | | | |
|---|---|---|---|
| 7,477,039 B2 | 1/2009 | Rodarte | |
| 8,055,310 B2 | 11/2011 | Beart | |
| 8,553,408 B2 | 10/2013 | Supran | |
| 8,629,577 B2 | 1/2014 | Azancot | |
| 9,362,985 B2 | 6/2016 | Uchida | |
| 9,450,446 B2 | 9/2016 | Baker | |
| 9,620,972 B2 | 4/2017 | Oh | |
| 9,680,329 B2 | 6/2017 | Janssen | |
| 9,824,815 B2 | 11/2017 | Leabman | |
| 9,906,067 B1 | 2/2018 | Garrity | |
| 9,941,730 B1 * | 4/2018 | Kim | H02J 7/0042 |
| 2008/0111518 A1 * | 5/2008 | Toya | H02J 50/90 |
| | | | 320/108 |
| 2008/0224655 A1 | 9/2008 | Tilley | |
| 2011/0012556 A1 | 1/2011 | Lai | |
| 2011/0074344 A1 | 3/2011 | Park | |
| 2011/0227527 A1 | 9/2011 | Zhu | |
| 2013/0119929 A1 | 5/2013 | Partovi | |
| 2015/0054452 A1 | 2/2015 | Ahn | |
| 2015/0303732 A1 * | 10/2015 | Dow | H02J 50/00 |
| | | | 320/108 |
| 2017/0093087 A1 * | 3/2017 | Esmaeili | H01R 13/6205 |
| 2017/0279291 A1 | 9/2017 | Miele | |

(Continued)

FOREIGN PATENT DOCUMENTS

KR 1608389 B1 * 4/2016

*Primary Examiner* — Nguyen T Vo
(74) *Attorney, Agent, or Firm* — Lambert Shortell & Connaughton; David J. Connaughton, Jr.; Justin P. Tinger (57) ABSTRACT

A wireless battery pack is provided which may be magnetically connected to a device to be charged having the capability for wireless charging. The battery pack includes an emitter coil and battery to provide wireless charging to a battery powered electronic device which is capable of wireless charging, including but not limited to cellular telephones.

13 Claims, 12 Drawing Sheets

(56) References Cited

U.S. PATENT DOCUMENTS

| | | | |
|---|---|---|---|
| 2018/0069358 A1* | 3/2018 | Miller | H04M 1/026 |
| 2018/0226827 A1* | 8/2018 | Chen | H02J 7/027 |
| 2019/0158136 A1* | 5/2019 | DiLella | H02J 7/025 |
| 2019/0237981 A1* | 8/2019 | Son | H02J 50/10 |

* cited by examiner

Fig. 12

WIRELESS CHARGING PACK

BACKGROUND

Technical Field

The present disclosure relates generally to wireless battery charging. More particularly the present disclosure relates to a battery pack which can wirelessly charge a battery-powered device.

Description of Related Art

Many cellular phones and other portable electronic devices are equipped with the capability for wireless charging. Typically this wireless charging operates using electromagnetic induction, with the cellular phone or other portable electronic device having a receiver coil to receive the charge. Resonant wireless charging, a type of inductive charging, is a developing area for wireless charging which also uses a receiver coil in the electronic device to be charged. This wireless charging capability greatly enhances the convenience of charging such devices. Often however, battery charging is needed when no charging source (wired or wireless) is available.

Further, wireless charging, especially inductive type, requires precise alignment of an emitter coil and receiver coil on the emitting charger and receiving device respectively. Typically this precise alignment is difficult to achieve, resulting in the charging not working. Resonant charging helps with this, but gives up efficiency and relies on a more complex charging system.

SUMMARY

The subject matter of this application may involve, in some cases, interrelated products, alternative solutions to a particular problem, and/or a plurality of different uses of a single system or article.

In one aspect, a battery pack operable to wirelessly charge a battery powered device is provided. The battery pack is defined on an exterior by a body. One of a magnet or magnetic metal is stored within the body to allow magnetic connection of the body to a device to be wirelessly charged. A battery is located within the body and is in communication with a receiver coil to receive an electric charge to charge the battery. The battery is also in communication with an emitter coil to provide a wireless charge. The magnet or magnetic metal is positioned within the body so as to not block an electric flow path of either the receiver coil or emitter coil.

In another aspect, the battery pack of the first aspect is magnetically connected to a cellular telephone. The magnetic connection is achieved by magnetic attraction of the at least one of the magnet and magnetic metal within the body to a corresponding magnet or magnetic metal in, on, or adjacent to the cellular telephone. This allows the emitter coil to be in electronic communication with a receiver coil of the cellular telephone, thereby allowing the battery to charge a battery of the phone.

In yet another aspect, a method of attaching a battery pack to a computerized electronic device having a receiver coil for wireless electronic charging is provided. The method involves aligning a stencil with the electronic device. A magnet and/or magnetic metal mount may then be positioned through an aperture defined by the stencil so as to properly position the mount to align with the receiver coil. The mount may then be adhered or otherwise secured to the device, and the stencil can be removed.

DETAILED DESCRIPTION

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

Generally, The present disclosure concerns a wireless charging system which may be particularly useful for wireless computing devices such as smartphones, tablet computers, or any battery powered electronic device capable of wireless charging. This system may be used as part of a mobile phone case, but may additionally be used directly with a device without a case. The wireless charging system may utilize a magnetic connection to hold a battery pack in close proximity to a battery powered device capable of being charged wirelessly. In one embodiment, a mount made of a magnet or magnetic metal may be positioned between a case for the device and the device, allowing a magnet or magnetic metal of the battery pack to be drawn thereto. In a particular embodiment, the mount may be a magnet or magnetic metal sticker attached to one of a case or the device. The magnet or magnetic metal may have an opening, or may define a shape such that it does not inhibit the wireless charging. For example, the magnet or magnetic metal may define a central opening. In another embodiment, the magnet or magnetic metal may be positioned only at a top, bottom, or adjacent to one or both sides of the device, thereby not blocking the wireless charging.

The wireless charging battery pack is formed of a battery, a wireless charging component such as an emitter coil which allows the device to wireless draw electrical power from the battery, and a charge receiver component such as a receiver coil which allows the battery to be wirelessly charged by a conventional plug-in wireless charger. The battery pack, as noted above, may also further contain a magnet or magnetic metal to allow magnetic connection to the device. Battery capacity may vary depending on embodiment. In a particular embodiment, the battery may have a 2000-3000 mAh capacity. Size and shape of the battery pack may also vary depending on embodiment. In a particular embodiment, the battery pack may be approximately 95 mm×50 mm×7 mm, +/−25% in length and width, and +/−50% in thickness.

In one embodiment, the battery pack may be entirely covered by a material such as a plastic, rubber, metal, composite, and the like. In a further embodiment, this material may provide a waterproof and/or water resistant seal, rendering the battery pack waterproof/water resistant.

In one embodiment, the battery pack may be recharged only by wireless charging. In another embodiment, the battery pack may be recharged by a corded connection such as micro-USB port on the body connected to the battery, or the like. In still another embodiment, the battery pack may be capable of being recharged by both wireless charging and a corded connection.

In another embodiment, the battery pack may have one or a plurality of indicator lights to indicate a proper placement location on the device to be charged.

Turning to FIGS. 1-4, one embodiment the wireless charger battery pack can be seen in various states of connection with a battery powered device. The device shown in the figure embodiments is a cellular telephone 12, also referred to as a smartphone. In this embodiment, the battery pack 10 is held in close proximity to a rear of the cellular telephone 12 by a magnet (or magnetic metal) 13 which is held in place between the cellular telephone 12 and a case 11. Of course, other configurations of magnetic connection may be made other than this embodiment shown. In varying embodiments, magnetic connection may be achieved by a magnet to magnet connection, or a magnet to magnetic metal connection. The magnet may be in either or both of the battery pack 10 or connected to the cellular telephone 12. When in such close proximity, the wireless charging operation automatically begins, charging a battery of the cellular telephone 12, and is held in place by the magnet (or magnetic metal) 13 engaged with a magnet or magnetic metal (not shown) within the battery pack 10.

Figure 1:
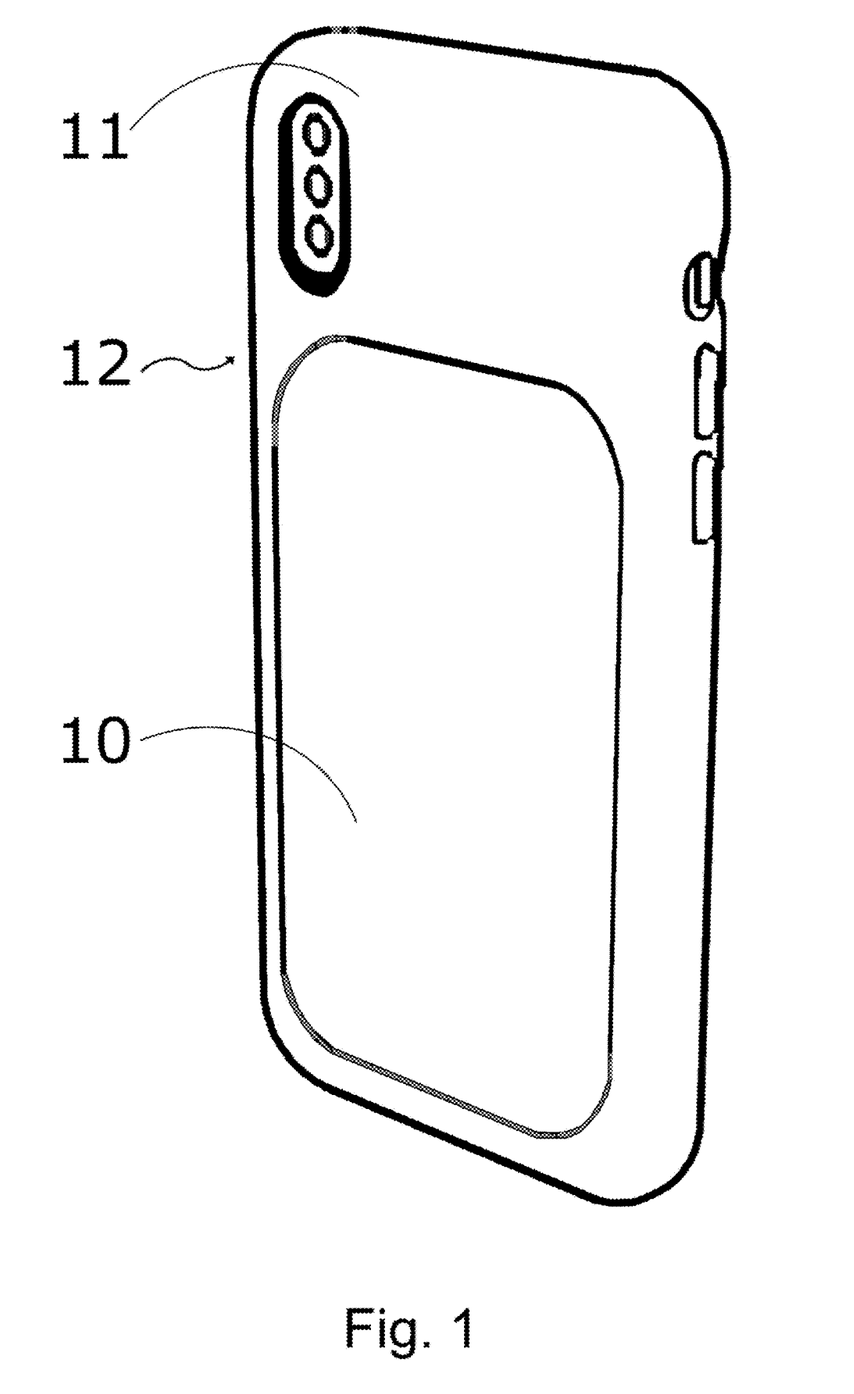
FIG. 1 provides a perspective view of an embodiment of the present invention.
Figure 2:
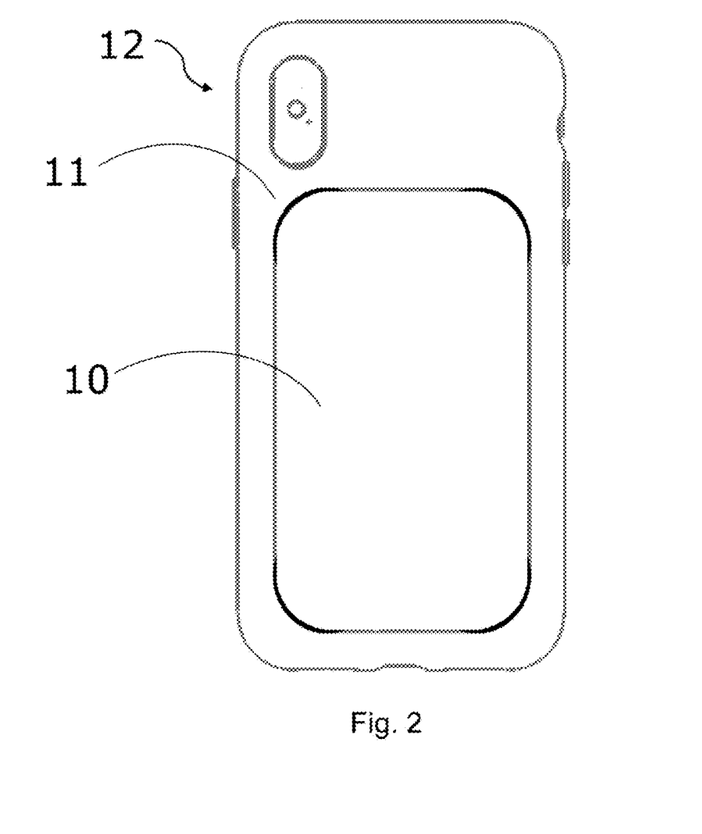
FIG. 2 provides an elevation view of the embodiment of FIG. 1.
Figure 3:
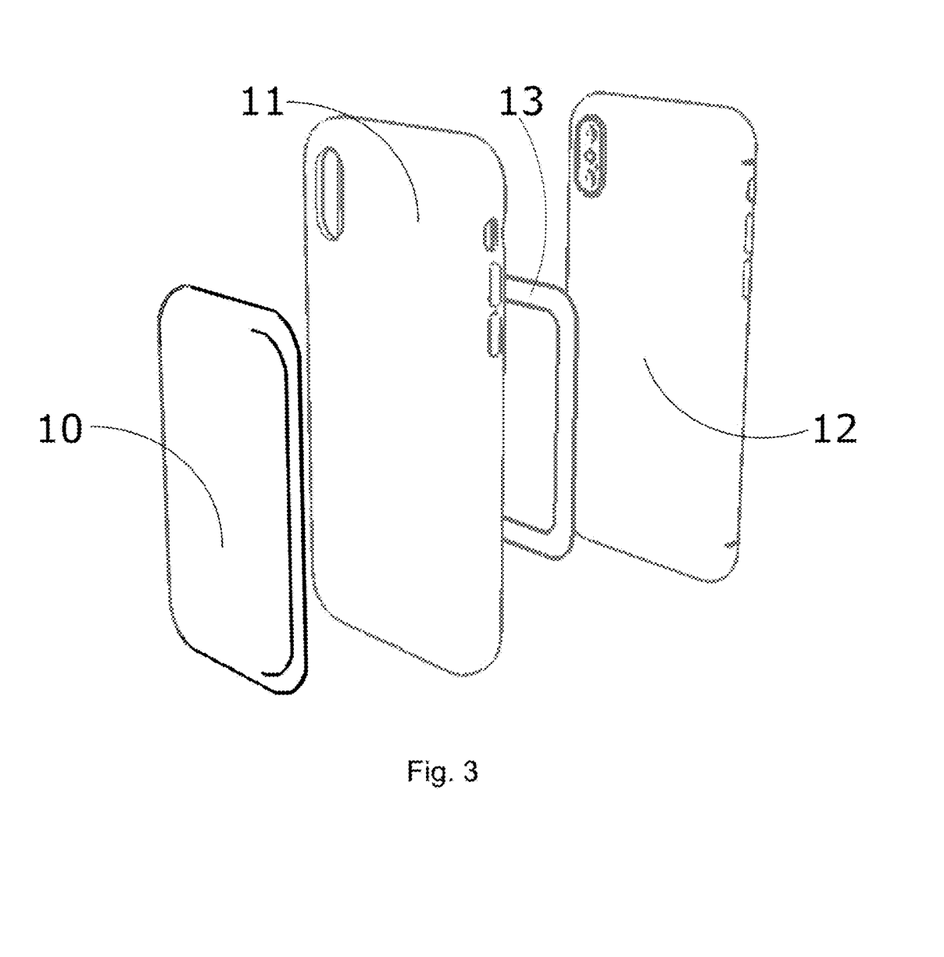
FIG. 3 provides a perspective exploded view of the embodiment of FIG. 1.
Figure 4:
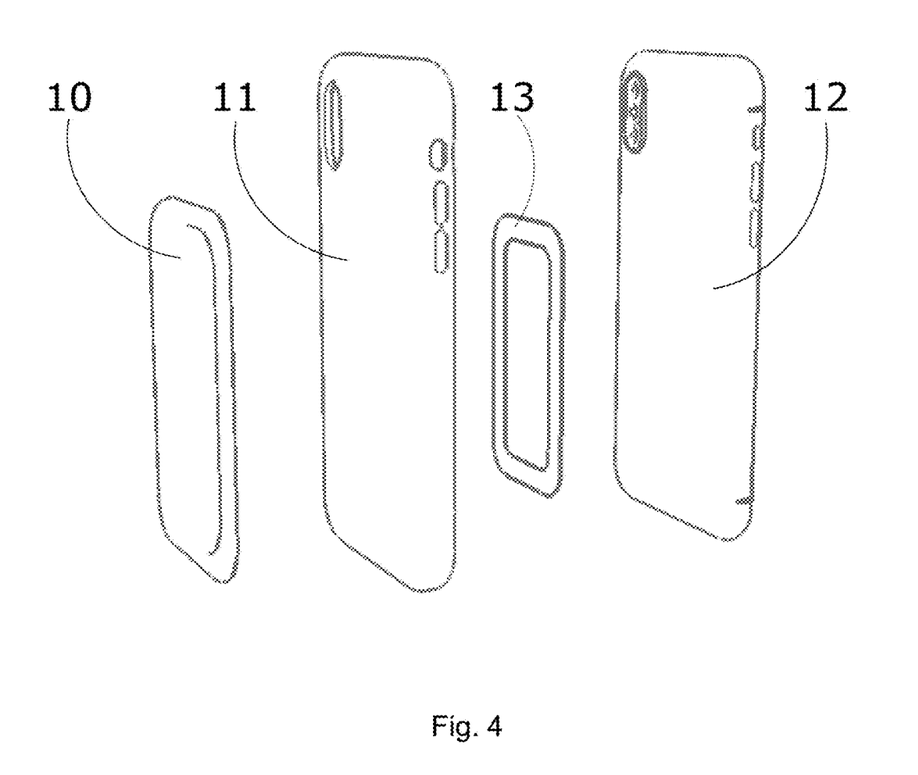
FIG. 4 provides another perspective exploded view of the embodiment of FIG. 1.
Figure 5:
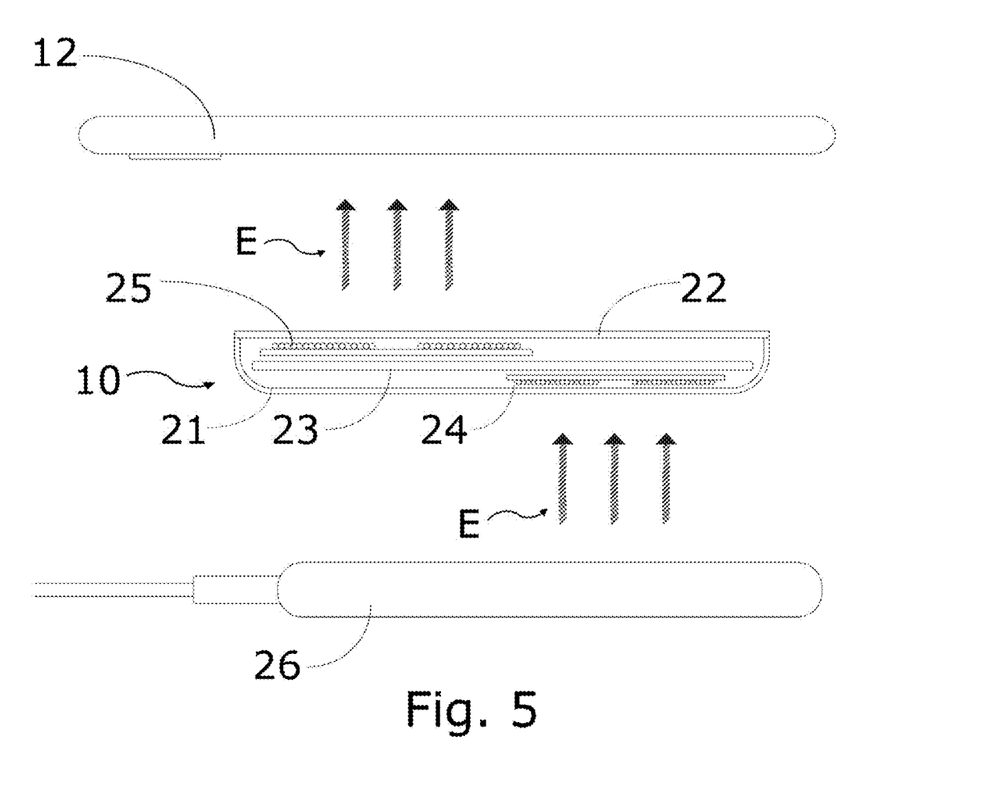
FIG. 5 provides a side view of an embodiment of the battery pack contemplated herein.
Figure 6:
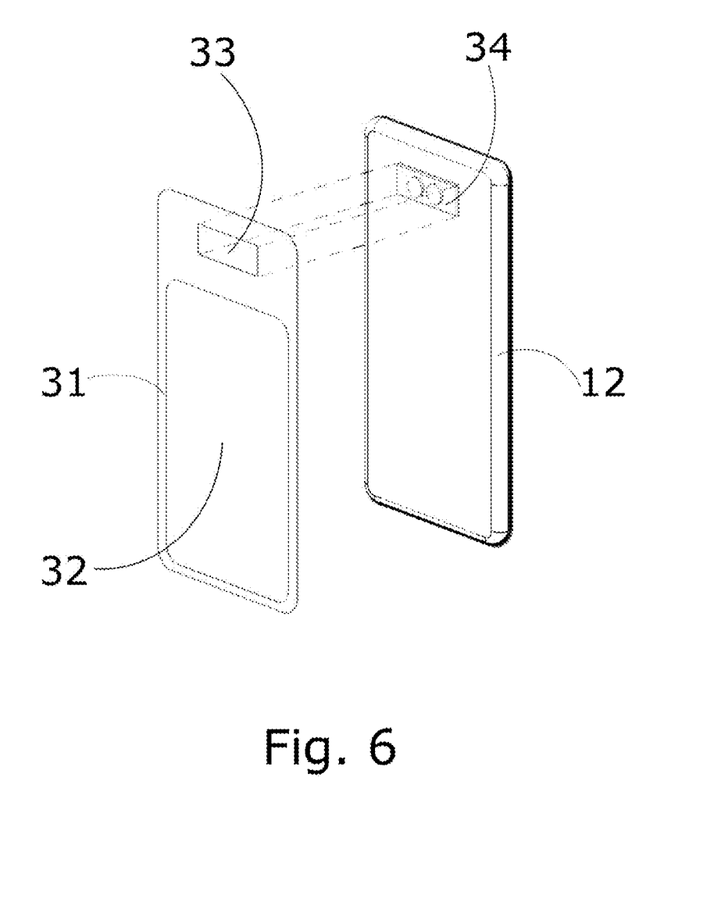
FIG. 6 provides a perspective view of an embodiment of connection of a mount to a battery powered device capable of wireless charging.
Figure 7:
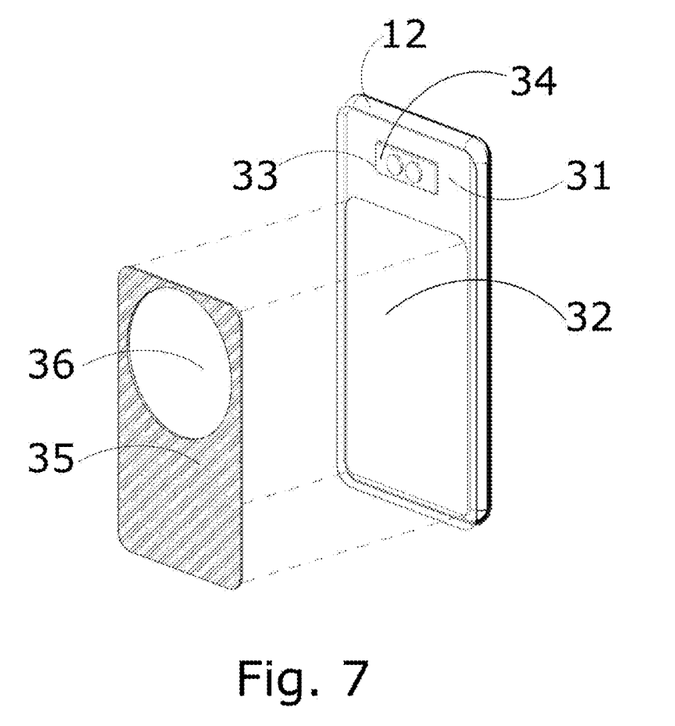
FIG. 7 provides a perspective view of an embodiment of connection of a mount to a battery powered device capable of wireless charging.
Figure 8:
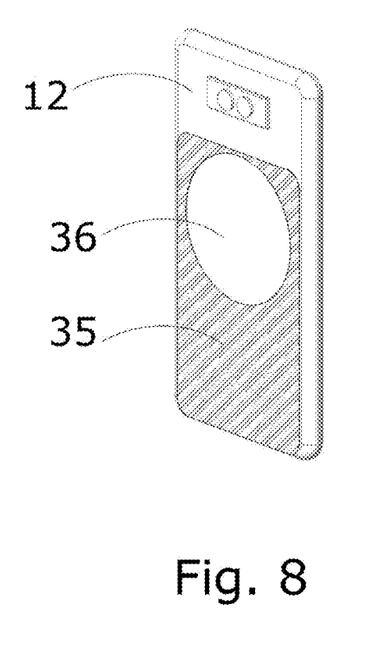
FIG. 8 provides a perspective view of an embodiment of connection of a mount to a battery powered device capable of wireless charging.
Figure 9:
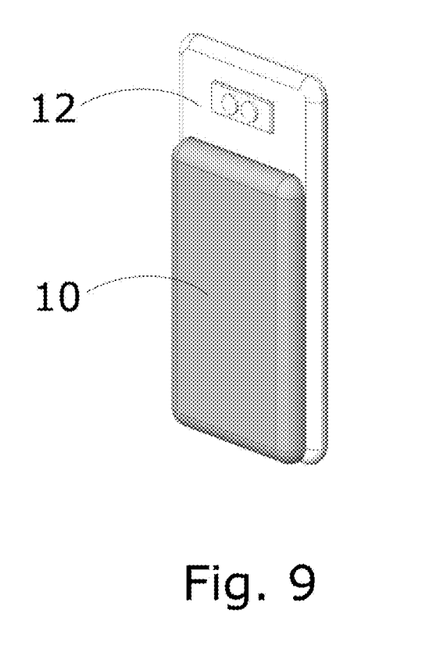
FIG. 9 provides a perspective view of an embodiment of connection of a mount to a battery powered device capable of wireless charging.

Referring to FIG. 5, an embodiment of the wireless battery pack is shown which can be both charged wirelessly, as well as provide the wireless charging. The battery pack 10 of this embodiment comprises a battery 23, and a receiver coil 24 to receive electricity from a wireless charger 26 in electrical communication with the battery 23 for charging the battery. The battery pack 10 further has an emitter coil 25 in communication with the battery for charging a device wirelessly. Electricity E can transfer from the wireless charger 26 to the battery 23 via receiver coil 24, and also from emitter coil 25 to a corresponding receiver coil (not shown) of the cellular telephone 12. The electricity E is shown in this figure to demonstrate charge direction. While possible that the battery receives and emits electricity at the same time, typically the receiving and emitting is done at different times. The battery pack 10 components are within the body 21 of the battery pack 10. The battery pack 10 also includes magnet (not shown), allowing connection of a front face 22 of the battery pack 10 to be held in place to the device to be charged, shown here as a cellular telephone 12. This embodiment, of course, can be used in the same ways as the various embodiments discussed herein.

FIGS. 6-9 show an embodiment of the invention which utilizes a stencil to guide proper placement of the metal mount connected to the device to be charged (here, a cellular telephone) which can allow magnetic connection with the magnet of the battery pack. Initially, a stencil 31 is placed on a rear of the device 12, shown here as a cellular telephone. This stencil 31 will be specifically designed to align with the receiver coil and other features or components of the particular device. As such, the stencil 31 configurations may vary. In this view, the stencil includes a specific cutout 33 to align with a protruding camera 34, thereby using the cellular telephone's 12 features to properly align the stencil. Further, mount cutout 32 is positioned so as to align the metal mount with the receiver coil within the cellular telephone 12. It is to be understood that any feature of the phone may be used, not just a protruding camera, including but not limited to a stencil which can snap-connect around a part or all of a perimeter of the cellular telephone 12. A metal mount 35 may align with the mount cutout 32 on the stencil 31. Metal mount 35 may be adhered or otherwise connected to the cellular telephone 12 or other device, so that it provides a surface for the magnet of the battery pack to attach magnetically. Once the metal mount 35 is connected to the cellular telephone 12 or other device, the stencil 31 may be removed, leaving the metal mount properly positioned. As noted above, there must be at least one magnet in either the battery pack or the device to be charged, and either a magnet to magnetic metal or magnet to magnet connection may be employed. Depending on embodiment, metal mount 35 may be a magnet, magnetic metal, or may have both magnet and magnetic metal in it.

The metal mount 35 is shown having an opening 36 in it. The opening 36 aligns with the receiver coil of the particular device so that electricity may pass through and is not blocked by the metal mount. Were the metal mount to not have this opening, the charging would fail, or at least be inefficient, because the electricity would be blocked by the metal. A similar solution to not block the electrical flow may include positioning a smaller metal mount 35 in an area of the device which does not block the receiver coil such as near a bottom, top, or side(s). While the mount is described as metal, in other embodiments, the mount may be formed of any material which a magnet can attach magnetically to. In other embodiments, the mount may have specifically placed magnets or material which magnets may attach magnetically to in certain areas or a certain pattern, so as to properly align the battery pack on the device to be charged.

Figure 10:
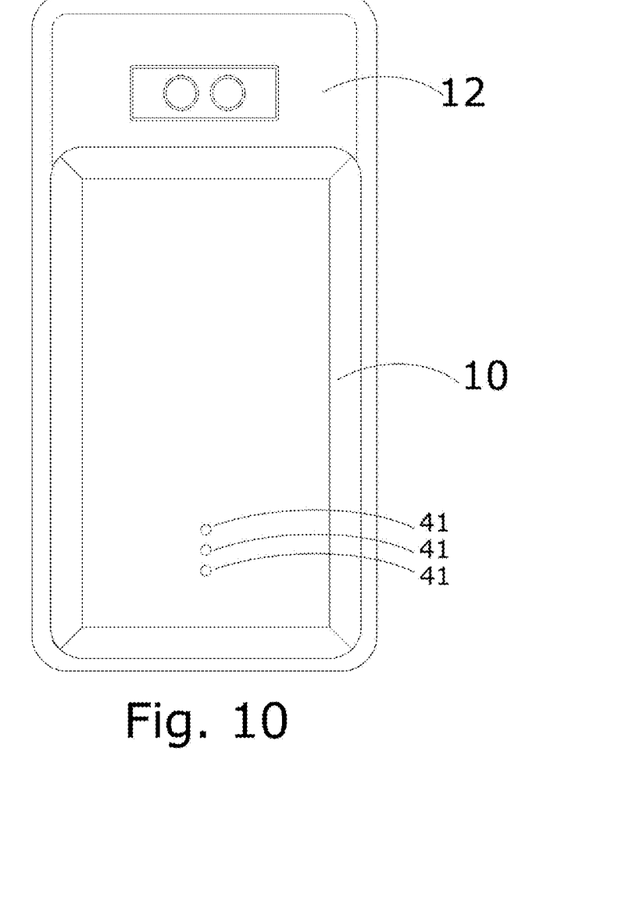
FIG. 10 provides an elevation view of an embodiment of the battery pack having a plurality of indicator lights.
Figure 11:
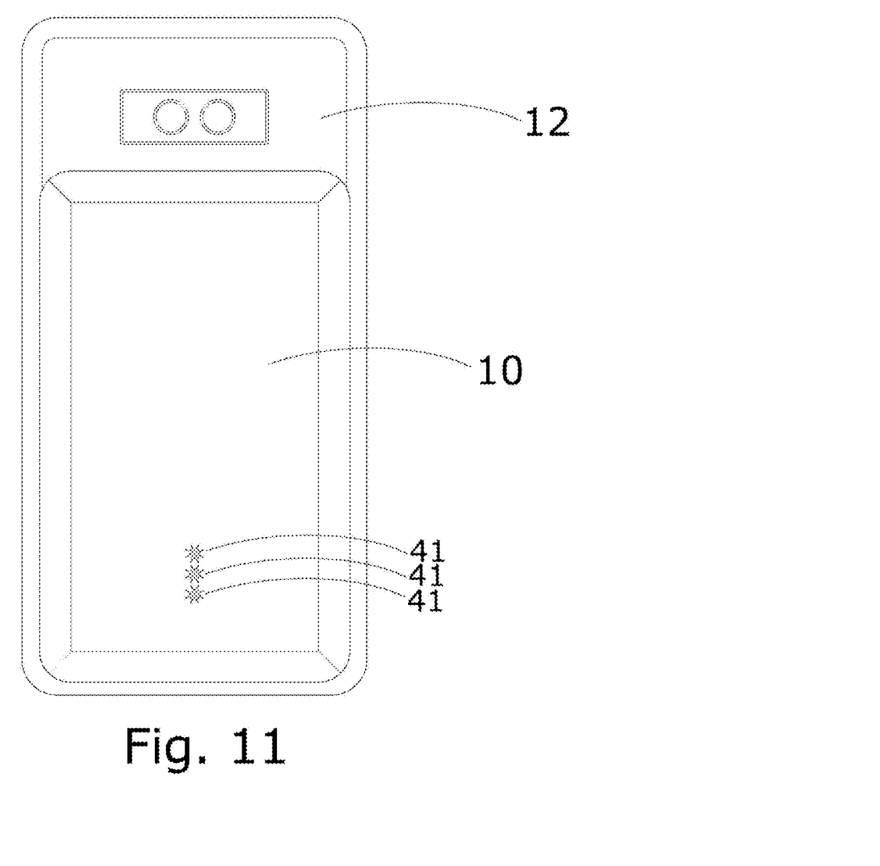
FIG. 11 provides an elevation view of an embodiment of the battery pack having a plurality of indicator lights.

FIGS. 10-11 show an embodiment of the battery pack having one or a plurality of indicator lights to indicate a proper placement location on the device to be charged. This indicator light embodiment may be employed on any of the other embodiments shown and/or disclosed herein. In one embodiment, the indicator light 41 may illuminate to indicate that charging is happening. In one embodiment, the indicator light 41 may operate using a proximity sensor to determine proximity of the emitter coil of the battery pack 10 to a receiver coil of the device, shown here as a cellular telephone 12. The proximity sensor may be any commercially available sensor, meter, or programming operable to detect how rapidly and/or efficiently the battery pack is transferring electricity to the device to be charged. For example, the proximity sensor may use a meter to measure inductance or another metric relating to the charging, or commercially available sensors may be used, or the proximity sensor may be a programming within a memory stored in the body which measures rate of battery de-charge. For example, as the battery pack 10 is moved around the cellular telephone 12, this inductance may vary from a maximum to minimum amount. Within this range, the indicator light 41 or lights 41 may activate upon reaching or failing to reach certain inductance levels. In embodiments having multiple indicator lights 41 may indicate one light for poor connection, two for medium connection, and three for good connection, among other embodiments.

Figure 12:
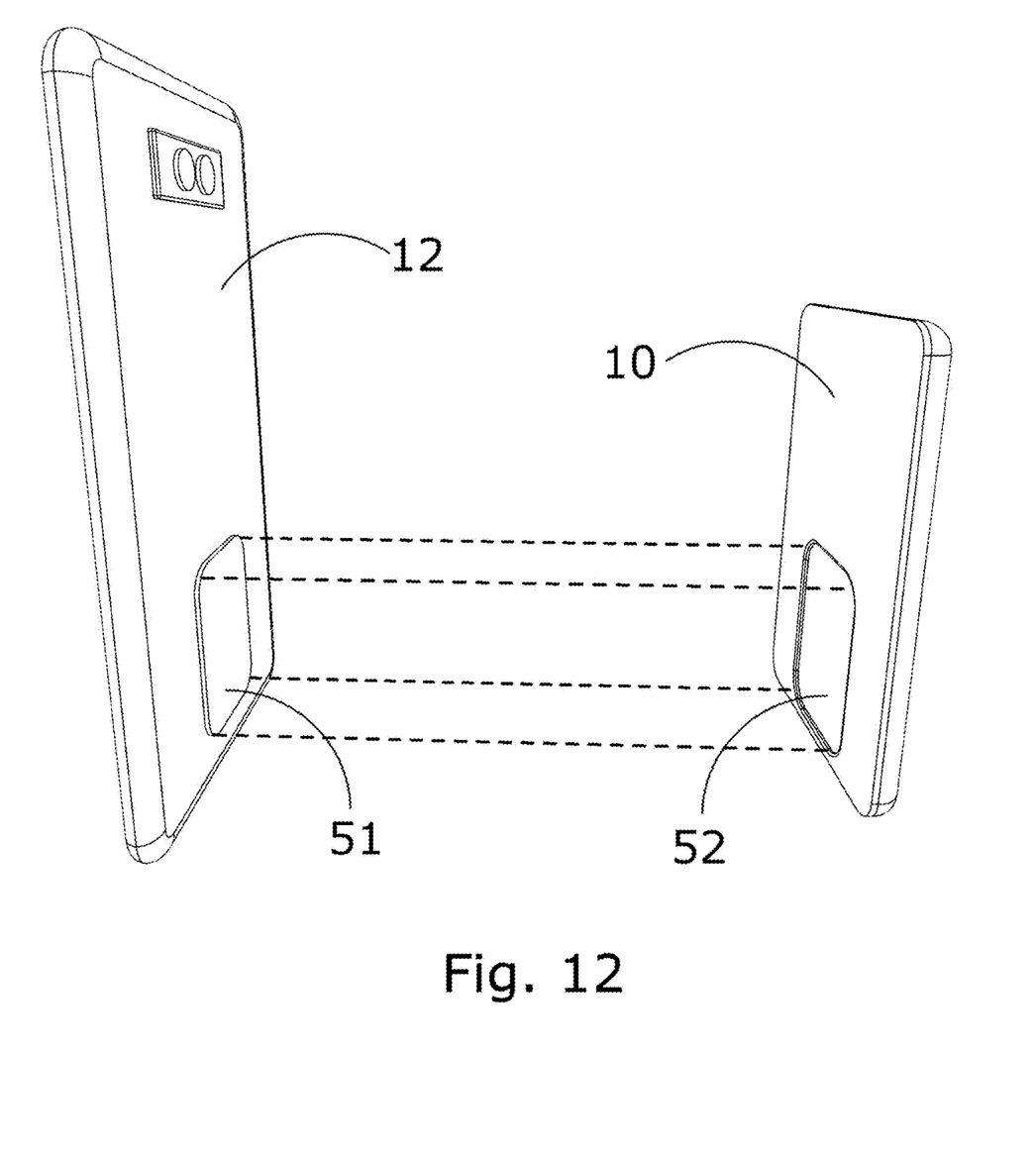
FIG. 12 provides a perspective view of yet another embodiment of the battery pack connecting to a battery powered device.

FIG. 12 shows another embodiment of the battery pack. In this embodiment, the body of the battery pack 10 may have a recess 52 on its surface. This recess 52 is sized and operable to align with a protruding metal mount 51, such as a magnet or magnetic metal which is attached to the device 12 to be charged. In such an embodiment, the body has a corresponding magnet or magnetic metal (not shown) aligned or in proximity with the recess 52, so as to allow magnetic connection between the protruding mount 51 and recess 52 of the battery pack 10 body. When mounted, not only is the battery pack 10 magnetically connected to the device 12 to be charged, it is also prevented from lateral movement by an engagement between side walls of the recess and edges of the mount. In many embodiments, the recess may have rounded or sloping edges to guide alignment. The recess may have any shape. In many embodiments, it is non-circular. Non-circular recesses and a corresponding mount sized to fit snugly therein limits not only lateral movement, but also rotational movement.

While many aspects of this invention are directed to use with a cellular telephone, it should be understood that the battery pack disclosed herein may be used with any type of device having a battery and a receiver coil for wireless charging. Moreover, in certain embodiments, the configurations and structures used to magnetically join the battery pack to the device to be charged may be employed in corded wireless charging systems which are plugged into a power source as well. It should be understood that the various aspects and embodiments noted herein may be interchangeable with other embodiments. Accordingly, features discussed in a particular embodiment may be usable with any other features discussed in other embodiments, without straying from the scope of this invention. In other words, this specification is intended to provide support for not only connection systems having the features given in the particular embodiments, but also for connection systems having aspects, elements, and features combined from various embodiments noted herein.

What is claimed is:

1. A charging assembly comprising:
    a battery pack comprising:
        a body;
        at least one of a magnet or magnetic metal within the body;
        a battery within the body;
        a receiver coil within the body and in electronic connection with the battery, the receiver coil operable to receive an electric charge to charge the battery;
        an emitter coil within the body and in electronic connection with the battery, the emitter coil operable to provide a wireless electric charge from the battery;
        wherein the at least one of the magnet or magnetic metal does not block an electric flow path of either of the receiver coil or the emitter coil; and
    a cellular telephone, the battery pack magnetically connected to the cellular telephone by the at least one of the magnet or magnetic metal within the body, the emitter coil in electronic communication with a receiver coil of the cellular telephone; and
    a case attached to the cellular telephone, wherein the at least one of the magnet and magnetic metal is a magnet, and comprising at least one of a second magnet or magnetic metal, the second magnet or magnetic metal positioned between the case and the cellular telephone, and held in place between the case and the cellular telephone, the second magnet or magnetic metal being magnetically engaged with the magnet of the battery pack, the second magnet or magnetic metal is a magnetic metal mount attached to a rear of the cellular telephone wherein the magnetic metal mount defines a continuous opening such that the magnet or magnetic metal material extends entirely around a perimeter of the receiver coil.

2. The charging assembly of claim 1 wherein the second magnet or magnetic metal does not block an electric flow path between the emitter coil and the receiver coil of the cellular telephone.

3. The charging assembly of claim 1 wherein the battery pack is rechargeable by a wired connection through a port of the body.

4. The charging assembly of claim 1 wherein the battery pack further comprises a proximity sensor, the proximity sensor operable to detect a proximity of the emitter coil of the battery pack to the receiver coil of the cellular telephone.

5. The charging assembly of claim 4 wherein the proximity sensor is in communication with at least one light on an exterior of the body, the at least one light illuminating to provide an indication of proximity between the emitter coil of the battery pack to the receiver coil of the cellular telephone.

6. The charging assembly of claim 1 wherein a surface of the body defines a recess, the recess engaged with a corresponding protruding at least one of a magnet or magnetic metal attached to the cellular telephone.

7. The charging assembly of claim 1 wherein the magnetic metal mount is adhered to the cellular telephone.

8. The charging assembly of claim 1 wherein the magnetic metal mount is adhered to the case.

9. A charging assembly comprising:
    a battery pack comprising:
        a body;
        at least one of a magnet or magnetic metal within the body;
        a battery within the body;
        a receiver coil within the body and in electronic connection with the battery, the receiver coil operable to receive an electric charge to charge the battery;
        an emitter coil within the body and in electronic connection with the battery, the emitter coil operable to provide a wireless electric charge from the battery;
        wherein the at least one of the magnet or magnetic metal does not block an electric flow path of either of the receiver coil or the emitter coil;
    a cellular telephone, the battery pack magnetically connected to the cellular telephone by the at least one of the magnet or magnetic metal within the body, the emitter coil in electronic communication with a receiver coil of the cellular telephone;
    further comprising a second magnet or magnetic metal is a magnetic metal mount at a rear of the cellular telephone wherein the magnetic metal mount defines an opening, the opening aligned with the receiver coil of the cellular telephone so as to not block an electric flow path between the emitter coil and the receiver coil of the cellular telephone; and a stencil aligned with a part of the cellular telephone, the metal mount positioned to align with the receiver coil of the cellular telephone by fitting within a cutout of the stencil.

10. The charging assembly of claim 9 wherein the magnetic metal mount is adhered to the cellular telephone.

11. The charging assembly of claim 9 wherein magnetic metal mount comprises a magnet.

12. The charging assembly of claim 9 wherein the magnetic metal mount is adhered to a case attached to the cellular telephone.

13. The charging assembly of claim 9 wherein the magnetic metal mount defines a continuous opening such that the magnet or magnetic metal material extends entirely around a perimeter of the receiver coil.

\* \* \* \* \*